United States Patent [19]

Jones et al.

[11] Patent Number: 4,913,094
[45] Date of Patent: Apr. 3, 1990

[54] ARTIFICIAL REEF SYSTEM

[76] Inventors: Barton G. Jones, P.O. Box 264, 472 W. Fourth St., Dubuque, Iowa 52001; Ray E. Greene, 3650 Ashford Dunwood Rd., Apt. 10-0, Atlanta, Ga. 30319; Eldon C. Blancher, II, 1717 Old Shell Rd., Mobile, Ala. 36604

[21] Appl. No.: 229,471

[22] Filed: Aug. 8, 1988

[51] Int. Cl.⁴ .............................................. A01K 61/00
[52] U.S. Cl. ............................................ 119/3; 119/4; 405/21; 405/30
[58] Field of Search ....................... 405/21, 23, 30–35, 405/24, 25; 49/3, 4

[56] References Cited

U.S. PATENT DOCUMENTS

| | | | |
|---|---|---|---|
| 2,092,183 | 9/1937 | Rehfeld | 405/19 |
| 3,314,396 | 4/1967 | Willinger | 119/3 X |
| 3,561,219 | 2/1971 | Nishizana et al. | 405/19 |
| 3,561,402 | 2/1971 | Ishida | 119/3 |
| 3,563,037 | 2/1971 | Stammers | 405/23 |
| 3,670,504 | 6/1972 | Hayes et al. | 405/32 |
| 3,898,958 | 8/1975 | Pranis, Jr. | |
| 3,929,100 | 12/1975 | Thomas et al. | |
| 4,130,994 | 12/1978 | Van Moss | 405/24 |
| 4,337,727 | 7/1982 | Mickelsen et al. | |
| 4,341,489 | 7/1982 | Karnas | |
| 4,388,019 | 6/1983 | Kajihara | |
| 4,439,059 | 3/1984 | Kikuzawa et al. | |
| 4,449,479 | 5/1984 | Saucier | |
| 4,508,057 | 4/1985 | Suzuki | |

FOREIGN PATENT DOCUMENTS 7923947 9/1979 France .
2468304 5/1981 France ................................. 119/3

OTHER PUBLICATIONS

Munters Tube Settling Systems, Bulletin No. ETS-4,8/79.

Primary Examiner—Dennis L. Taylor
Attorney, Agent, or Firm—Fleit, Jacobson, Cohn, Price, Holman & Stern

[57] ABSTRACT

An artificial reef system including the selective positioning of artificial reef modules on the floor of a body of water for creating a feeding and shelter environment for fish. The artificial reef module includes a column of corrugated sheets formed of polyvinyl chloride, each sheet having a predetermined surface area for allowing the attachment and growth of microorganisms. The corrugated sheets are attached together along their length so that a plurality of partially enclosed spaces are created between adjacent sheets to act as shelter for small fish from their predators. The artificial reef modules are positioned on the floor of a body of water in various geometrical patterns to effect an ideal culturing environment for fish.

12 Claims, 9 Drawing Sheets

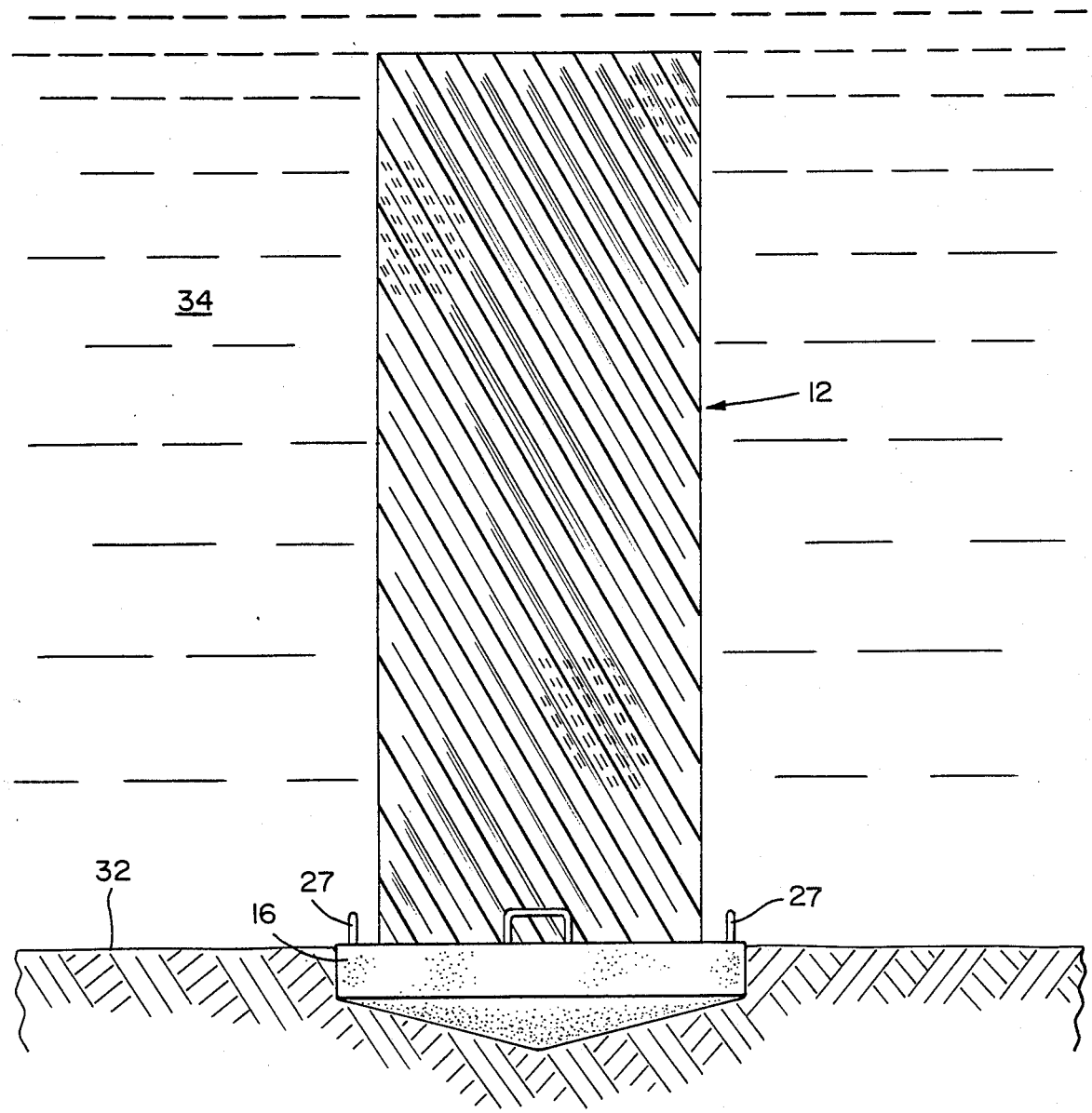

ARTIFICIAL REEF SYSTEM

FIELD OF THE INVENTION

This invention relates to an artificial reef system, and to the structure of an artificial reef module arranged on the ocean floor for providing an environment suitable for raising fishery products, such as fish and shellfish.

BACKGROUND OF THE INVENTION

Presently, various artificial fishing fields have been developed and used for raising fishery products, such as fish and shellfish. These types of fishing fields are intended for luring adult fish and shellfish to create an artificial fishing field. Realization of this type of fishing field has been accomplished by submerging cars, buses, tires, steel, or stone. Microorganisms attach to this debris and provide feeding areas for fish.

In addition, due to a recent trend towards a depletion of fishery resources, there is an increasing demand for developing an artificial fishing field aimed at raising or culturing fishery resources. This culturing type of fishing field is intended for sheltering and feeding juvenile fish and shellfish.

In the juvenile stages of development, the fish and shellfish feed off of microorganisms and seaweed. Therefore, it is imperative to provide adequate surfaces for microorganisms to attach or otherwise anchor onto the artificial fishing field.

Several attempts, based primarily on structural considerations, have been made to provide artificial fishing fields for culturing fish and shellfish.

U.S. Pat. No. 3,898,958 to Pranis, Jr. discloses an artificial fish farming apparatus in the form of a three-dimensional lattice framework to provide adequate surface areas for the anchoring, growth, and accumulation of microorganisms as a food supply for small fish. The basic structure of this lattice framework comprises the interconnection of pipes having various geometrical shapes and cross-sections for providing adequate surface area to support microorganisms. However, the major disadvantage of the Pranis, Jr. apparatus is its inability to provide sufficient surface area in a relatively complex structure, for enhancing the growth of microorganisms and the protection of small fish from predators.

U.S. Pat. No. 4,508,057 to Suzuki discloses an artificial fishing field unit comprised of concrete blocks having high resistance to strong waves and fast ocean currents that exist in shallow water zones. In addition, to prevent emission of strong alkali from the surface of the concrete block, crystal blocks of iron sulfate are embedded below the surface of the concrete before the concrete has been cured. The strong alkali contained in the concrete is neutralized with the acid from the iron sulfate. A plurality of these artificial fishing fields are arranged on the ocean floor for creating a culturing fishing field in shallow water zones. The major disadvantage of the Suzuki reef design is its awkward bulk associated with each artificial fishing field due to its concrete-based structure. Further, this type of artificial fishing field fails to provide adequate shelter for protecting small fish from their predators.

SUMMARY OF THE INVENTION

The artificial reef system of the present invention simulates the early formation of a natural reef to overcome the disadvantages of the prior art by providing artificial reef modules including a column of corrugated sheets of polyvinyl chloride (PVC) material attached together along their length. Adjacent corrugated sheets have their corrugations extending in perpendicular direction to provide partially enclosed spaces when attached together within an artificial reef module for protection of small fish. Each reef module includes an anchoring device attached at one end of the column of corrugated sheets for anchoring the module to the floor of a body of water.

In accordance with the preferred embodiment of this invention, the artificial reef modules are arranged in various geometrical or spatial configurations on the floor of a shallow body of water, such as coastal inwaters. A basic unit set of modules includes a central module surrounded by four additional modules. Three basic unit sets of modules are arranged in an equilateral triangle to form one group of modules.

Various artificial reef systems are developed from the specific spatial placement of a plurality of basic unit sets. Specifically, a mini-artificial reef system comprises seven basic unit sets arranged in a hexagonal pattern. A standard artificial reef system comprises the arrangement of ten basic unit sets in an equilateral triangular pattern. A barrier artificial reef system includes the arrangement of sets of modules in parallel linear arrays. In addition, further arrangements of artificial modules are provided for use in artificial reef systems with a trolling lane.

It is a principal object of this invention to provide an artificial reef system which overcomes the above-mentioned deficiencies of the prior art and which enhances reef production by providing shelter and forage for reef species, unlike many reefs that simply attract fish for feeding alone.

It is an additional object of this invention to provide an artificial reef unit having maximum surface area for the attachment and anchoring of microorganisms and thus increase the amount of food available in each artificial reef unit for reef species.

It is another object of this invention to provide an artificial reef unit having maximum surface area for enhancing microorganism growth and also having partially enclosed spaces which act as shelters for the protection of small fish from their predators.

It is another object of this invention to provide an artificial reef unit for enhancing microorganism growth through polarization of organic macromolecules present in the body of water on a molecular positively charged surface resulting in the concentration of nutrients essential to bacterial film establishment.

It is another object of this invention to provide an artificial reef unit for enhancing microorganism growth through colonization of the surface of the invention by bacteria through chemotactic responses and subsequent production of biological polymers resulting in the establishment of the primary bacterial film.

It is another object of this invention to provide an artificial reef unit for enhancing microorganism growth through growth of primary producers (plants) when the invention is placed within the photic zone.

It is another object of the present invention to provide an artificial reef unit for enhancing microorganism growth through the establishment of protozoan "grazers" feeding off the previously established organisms resulting in secondary production.

It is another object of the present invention to provide an artificial reef unit for enhancing microorganism growth through the settlement of larger encrusting organisms which serve as food in the attraction of fish.

It is another object of the present invention to provide an artificial reef unit for enhancing microorganism growth through the attraction of smaller and larger fish species because of natural food source and structure for protection from larger carnivorous species.

It is another object of the present invention to provide an artificial reef unit for enhancing microorganism growth in which the original substrate becomes less important with the passage of time, since continued deposition and settling results in a reef structure that is eventually identical to a natural reef. Successful reef growth depends on the establishment of the food chain foundation, the primary bacterial film. The surface of the invention promotes the attraction and settling of bacteria by virtue of its PVC material base, a substance with known affinity for microbial attraction. The physical design of the invention enhances subsequent successional stages by promoting the settling of organisms which pass through the openings in the invention. The settling animals find sufficient fertile area in which to grow and prosper.

It is yet a further object of this invention to provide an artificial reef system comprising various geometrical arrangements of artificial reef modules along the ocean floor for effecting a well-controlled and productive artificial reef system in various types of underwater locations.

The above and other objects and advantages of the present invention will become apparent when reference is made to the following description, taken in conjunction with the accompanying drawings.

BRIEF DESCRIPTION OF THE DRAWINGS

FIG. 7a is a side view illustrating an artificial reef module anchored into the floor of a body of water.

DETAILED DESCRIPTION OF THE DRAWINGS

Figure 1:
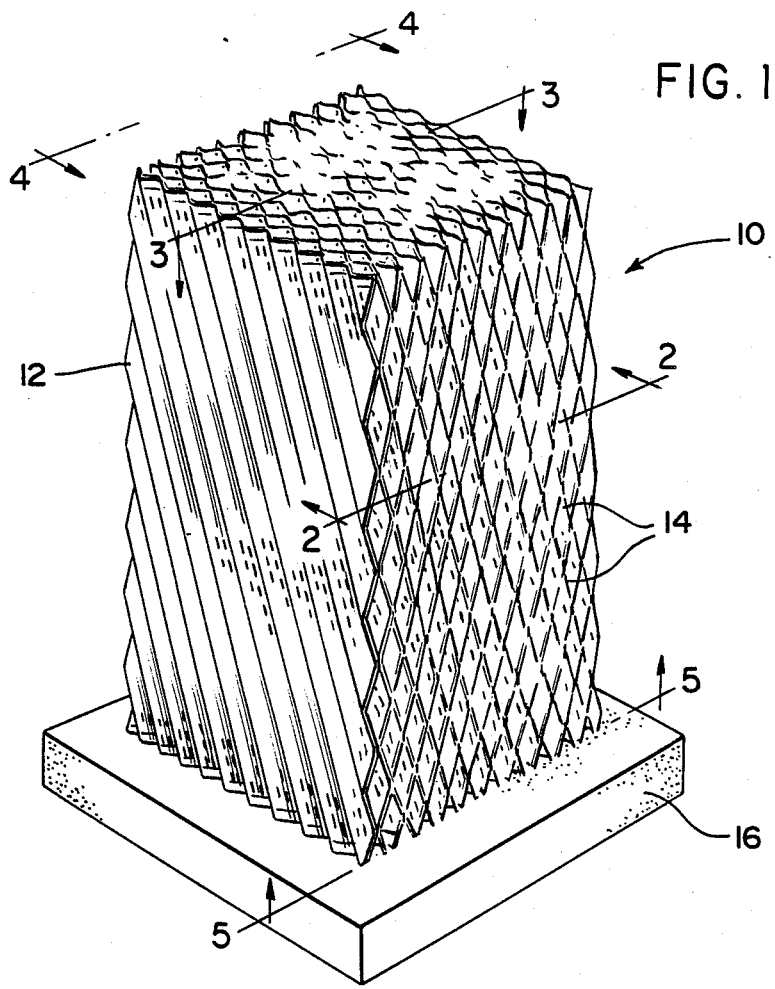
FIG. 1 is a perspective view of an artificial reef module illustrating the corrugated PVC sheets of the invention formed into a column in accordance with the preferred embodiment of this invention.

Referring first to FIG. 1, artificial reef module 10 is schemtically shown comprising a column 12 of corrugated plastic sheets 14 made of polyvinyl chloride (PVC). Module 10 includes a base and an anchoring structure 16 attached to the bottom end of column 12.

Figure 2:
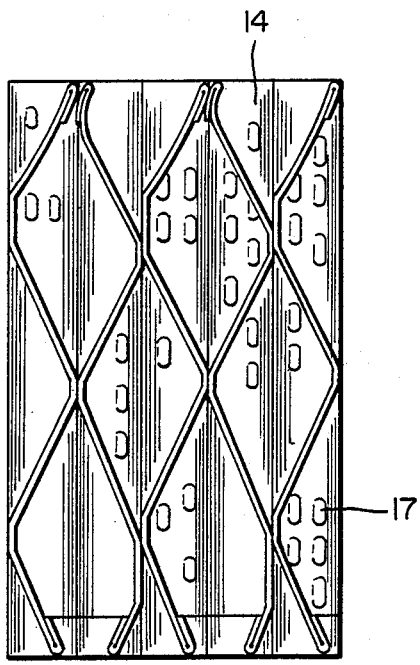
FIG. 2 is a side view as seen along line 2—2 of FIG. 1.
Figure 3:
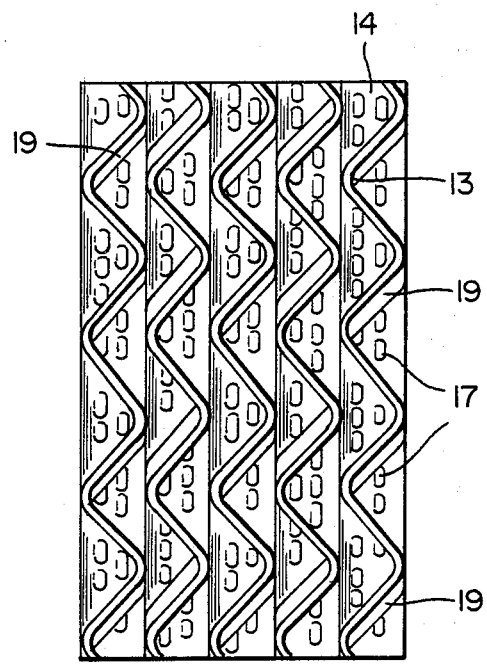
FIG. 3 is a top view as seen along line 3—3 of FIG. 1.

The construction of column 12 and corrugated sheets 14 is illustrated in more detail in FIGS. 2-5a. FIG. 2 shows a side of column 12 which is accessible to fish.

Figure 4:
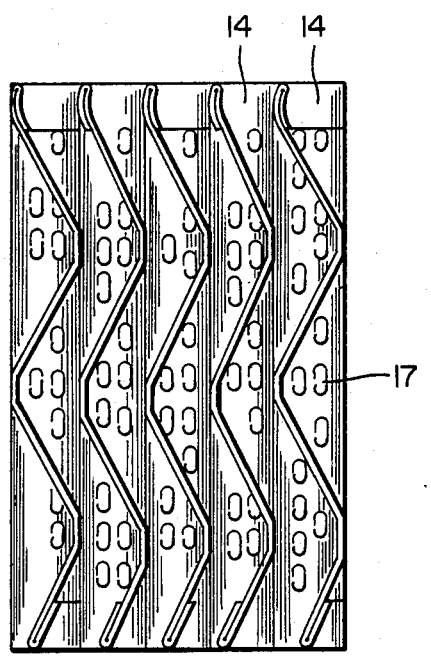
FIG. 4 is a side view as seen along line 4—4 of FIG. 1.
Figure 5:
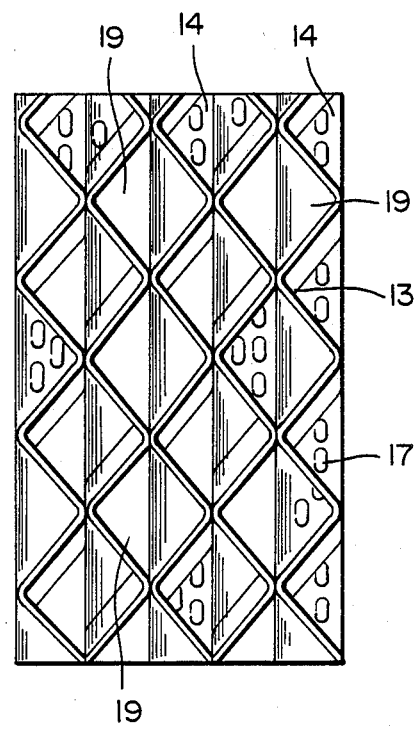
FIG. 5 is a cross-sectional view as seen along line 5—5 of FIG. 1.

As illustrated in FIGS. 2 and 4, adjacent sheets 14 are attached together so that their corresponding corrugated surfaces extend substantially perpendicular to each other and are secured together at intersecting sites 13. Preferably, every adjacent sheet 14 includes corrugations extending perpendicular or at least transverse to the corrugations of an adjacent sheet. Small, surface projections 17 are provided on the corrugated surfaces of each sheet 14 to further enhance the attachment and thus growth of microorganisms.

Figure 5A:
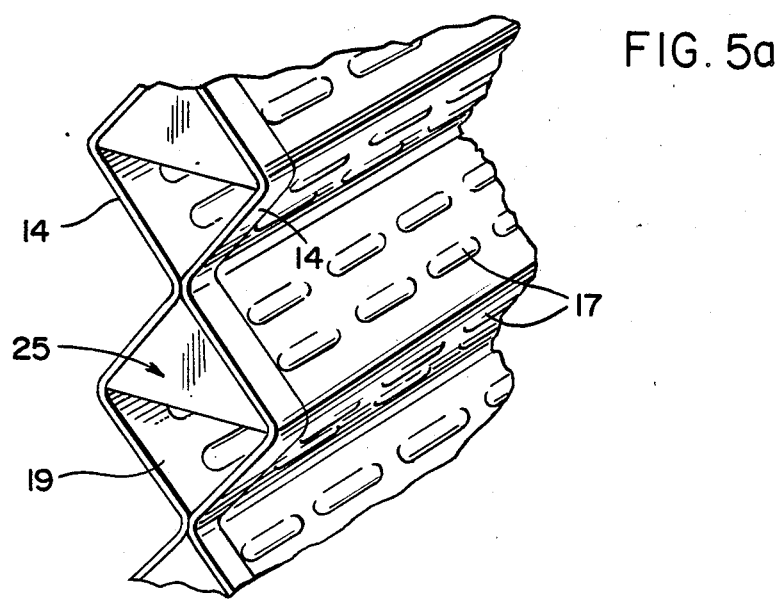
FIG. 5a, is a partial side perspective view showing the attachment of adjacent corrugated PVC sheets forming the artificial reef module of FIG. 1.

As shown in FIGS. 2 and 4, small square openings 19 are provided along the sides of column 12 between adjacent sheets 14. As shown in FIG. 5a, these openings lead to partially enclosed spaces 25 located between adjacent sheets.

Typically, the space between adjacent peaks separated by a valley of each corrugation of each sheet 14 is on the order of 2.5 to 3 inches when the module is used for small fish and shellfish. However, the space of the undulating pattern of the corrugation is increased to 5.5 to 6 inches if it is desired to allow larger fish and shellfish, such as lobsters, to inhabit the module. In the preferred embodiment, each plastic sheet 14 is formed of a material, which is a preformed corrugated type of polyvinyl chloride (PVC).

Figure 6:
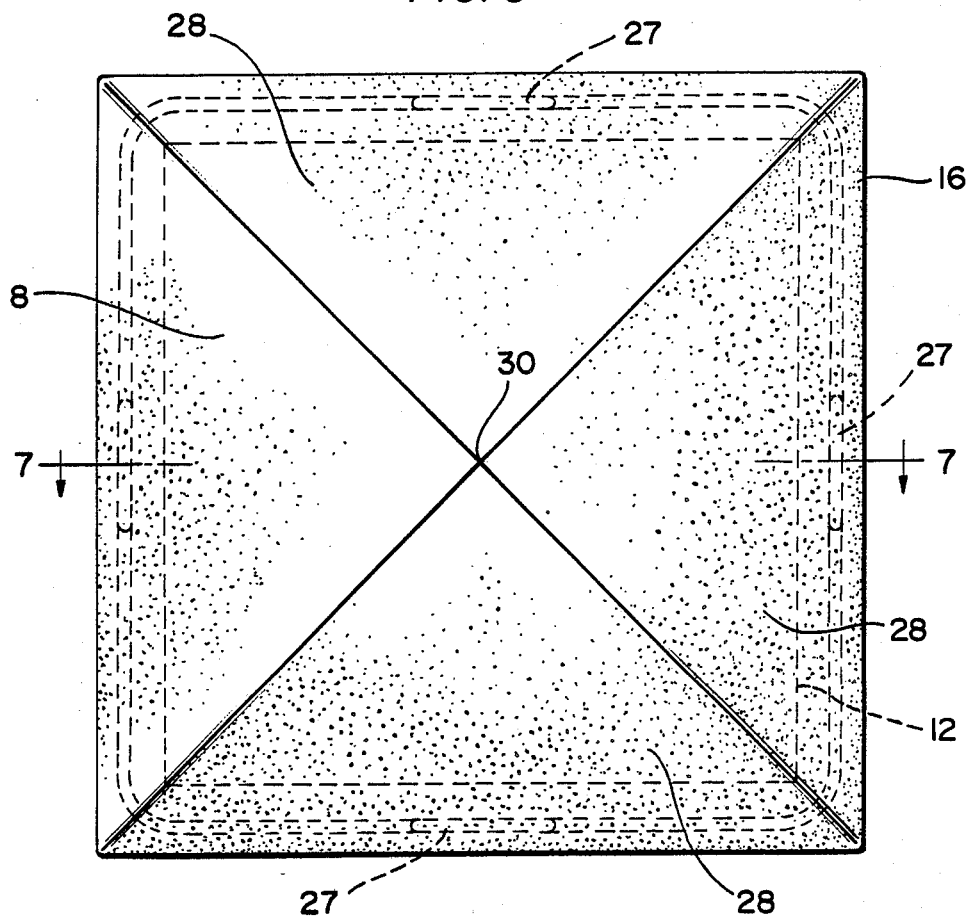
FIG. 6 is a bottom view of the artificial reef module of FIG. 1 illustrating the anchoring device attached to the reef module.
Figure 7:
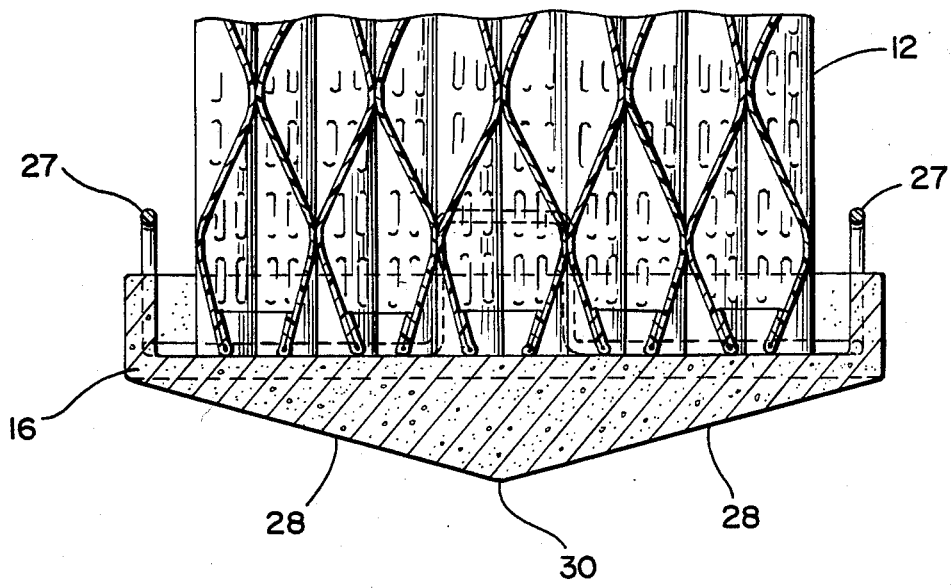
FIG. 7 is a cross-sectional view taken through line 7—7 of FIG. 6.

Referring to FIGS. 6 and 7, base and anchoring structure 16 and its attachment to column 12 of corrugated plastic sheets 14 is illustrated in more detail. In addition, handles 27 are attached to the bottom of column 12 for facilitating removable attachment of column 12 to the anchor 16. To mount column 12 onto anchor 16, the bottom of column 12 is placed into anchor 16 and secured during curing of concrete anchor by mechanical retention. Thereafter, column 12 and anchor 16 are bound together, to lodge and firmly engage between corrugated plastic sheets 14 of column 12.

Preferably, anchor 16 is formed completely of concrete for holding column 12 submerged under water. In addition, slanted base surfaces 28 are provided on the bottom of anchor 16 which converge at a center point 30. The base surfaces form an extension to penetrate into the ocean floor to anchor the module.

In use, artificial reef module 10 is anchored to the floor of a body of water as illustrated in FIG. 7a. The depth of the body of water is preferably relatively shallow to allow sufficient sunlight to project onto the column 12 for enhancing the growth of algae and other microorganisms. Typically, anchor 16 and column 12 are attached together as one unit prior to being submerged under water and attached to the floor 32.

While the dimensions of column 12 may vary, it is envisioned that the total height range is from 4 to 6 feet and the cross-sectional area is on the order of 4 square feet. More importantly, column 12 maximizes available surface area for growth of microorganisms, as provided by the corrugated plastic sheets 14. A preferred ratio of surface area per cubic foot of volume is approximately 30 square feet of surface area in a cubic foot of volume. Further, the sheets 14 include a plurality of partially enclosed spaces for providing shelter and protection for small fish from their predators.

Figure 8:
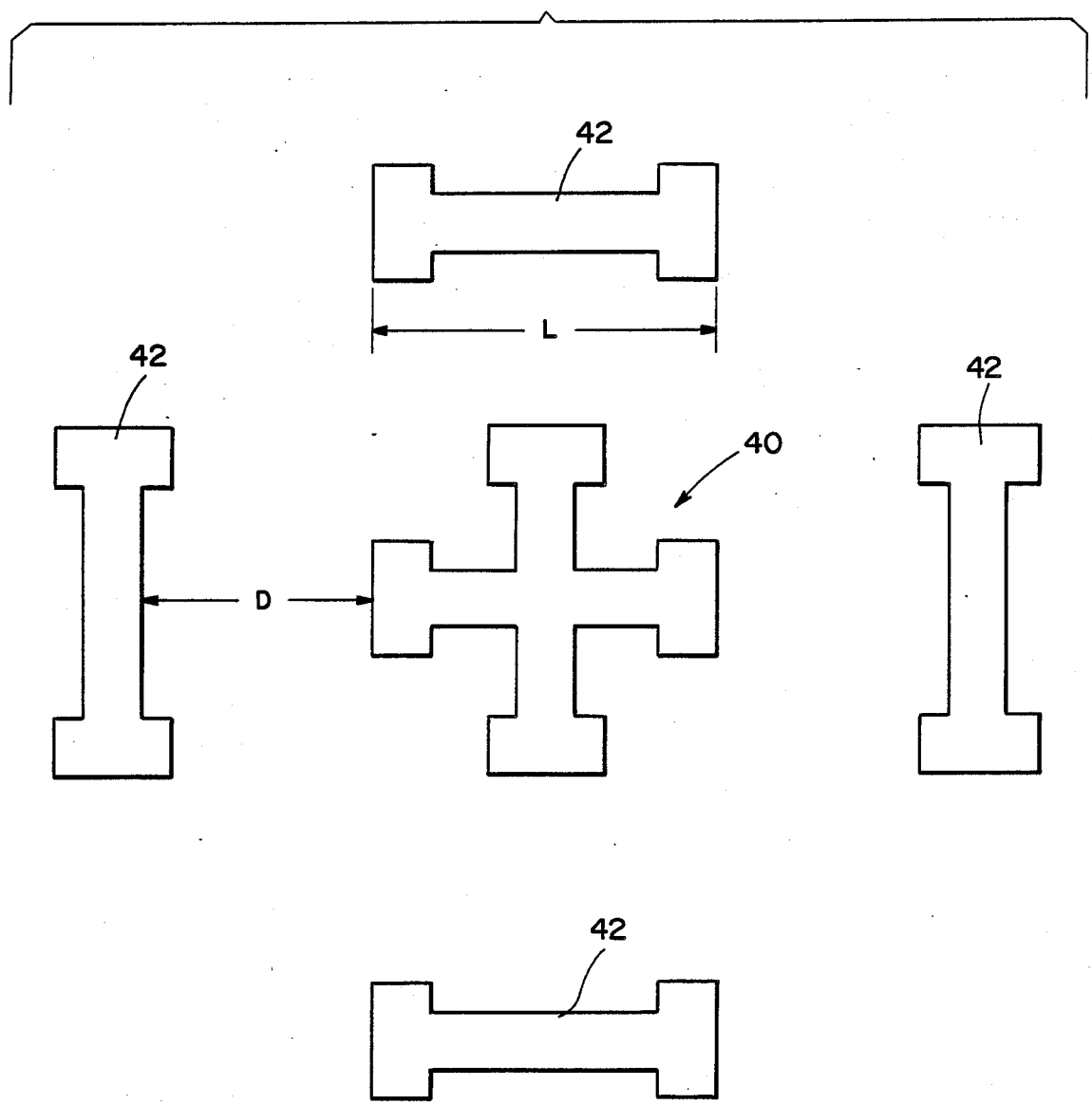
FIG. 8 is a schematic diagram illustrating the arrangement of five artificial reef modules in a basic unit set.

Referring to FIG. 8, artificial reef modules having structures similar to that described in conjunction with FIGS. 1–7 are shown attached on the floor of a body of water in a basic unit set configuration 36. A central artificial reef module 40 formed into an "X" or cross shape is symmetrically surrounded by four "I"-shaped artificial reef modules. Typically, the length L of a peripheral module 42 is on the order of 12 feet. Further, the closest distance D between the central module 40 and an outer module 42 is approximately 8 feet.

Figure 9:
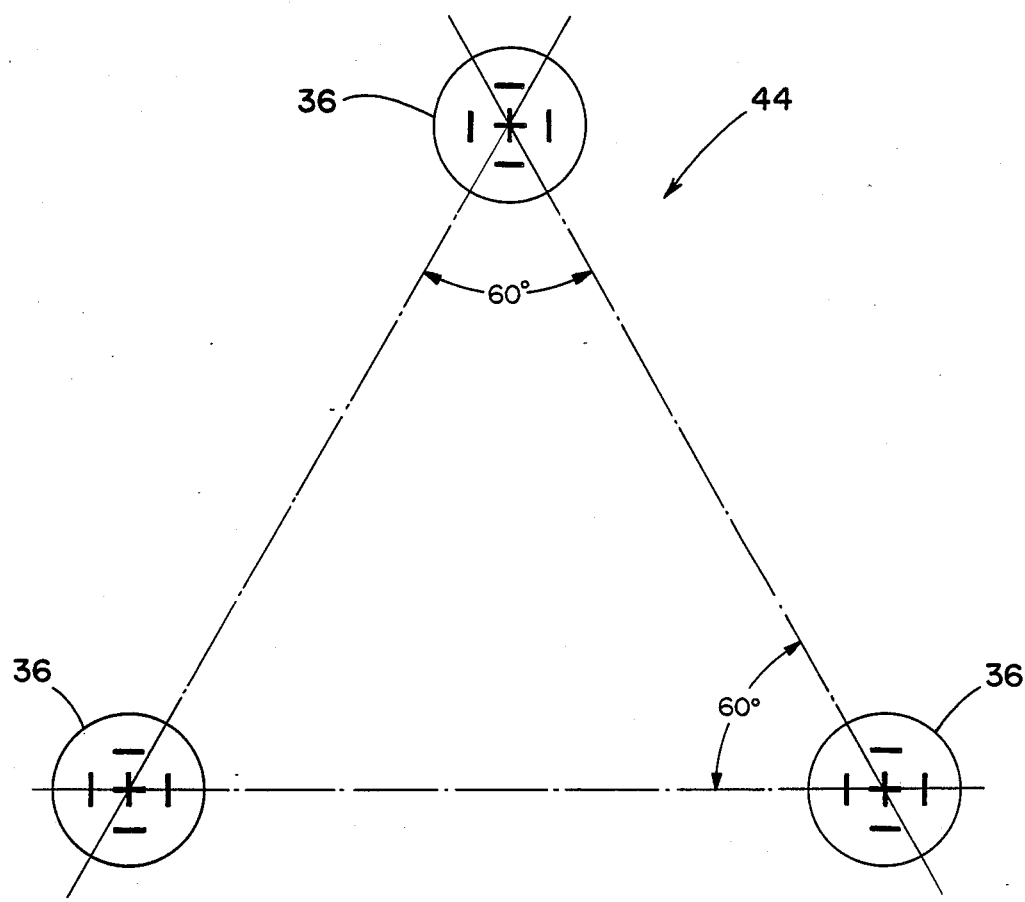
FIG. 9 is a schematic diagram illustrating the arrangement of the three basic unit sets of modules in a equilateral triangular configuration forming a group of artificial reef modules.

FIG. 9 illustrates the arrangement of three basic unit sets 36 to form a group 44. Three basic unit sets 36 are placed at the vertices of an equilateral triangle with the distance between two sets being approximately 100 yards. The equilateral triangular spatial arrangement of a group, as illustrated in FIG. 9, facilitates transposition to Loran coordinates for programming the autopilot of a placement vessel.

Figure 10A:
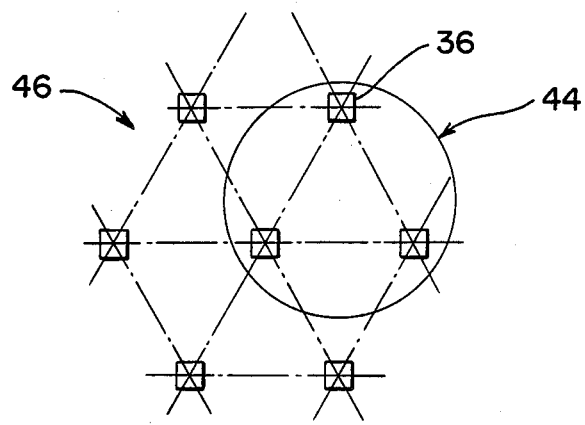
FIGS. 10a through 10g are schematic diagrams illustrating various artificial reef systems in accordance with the teachings of the present invention.
Figure 10B:
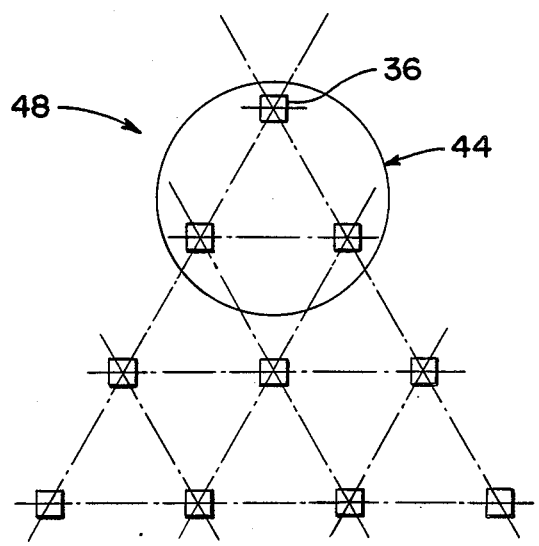
Figure 10C:
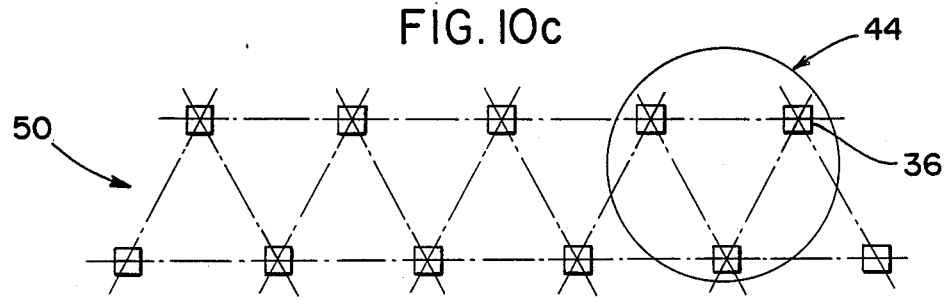

Referring to FIGS. 10a–10c, the spatial arrangement of basic artificial reef systems are illustrated. FIG. 10a shows a mini-artificial reef system 46 comprising seven sets 36 of artificial reef modules. The relative position of each set 36 in this system is derived from the appropriate arrangement of sets 36 into groups 44 to form a hexagonal configuration having six sides of equal length. Mini-artificial reef system 46 is ideal for use when underwater area is limited. A larger standard artificial reef system is illustrated in FIG. 10b at reference numeral 48. In this system, ten sets 36 of artificial reef modules are arranged in a large equilateral triangular pattern. In FIG. 10c, a basic artificial barrier reef system 50 is shown comprising 11 sets 36 of modules arranged in two parallel linear arrays with each array being offset from the other to form groups 44 between arrays. In the artificial reef systems illustrated in FIGS. 10a–10c, the actual placement of modules can be accomplished by forming groups of sets and programming the autopilot of a placement vessel with the appropriate Loran coordinates.

Figure 10D:
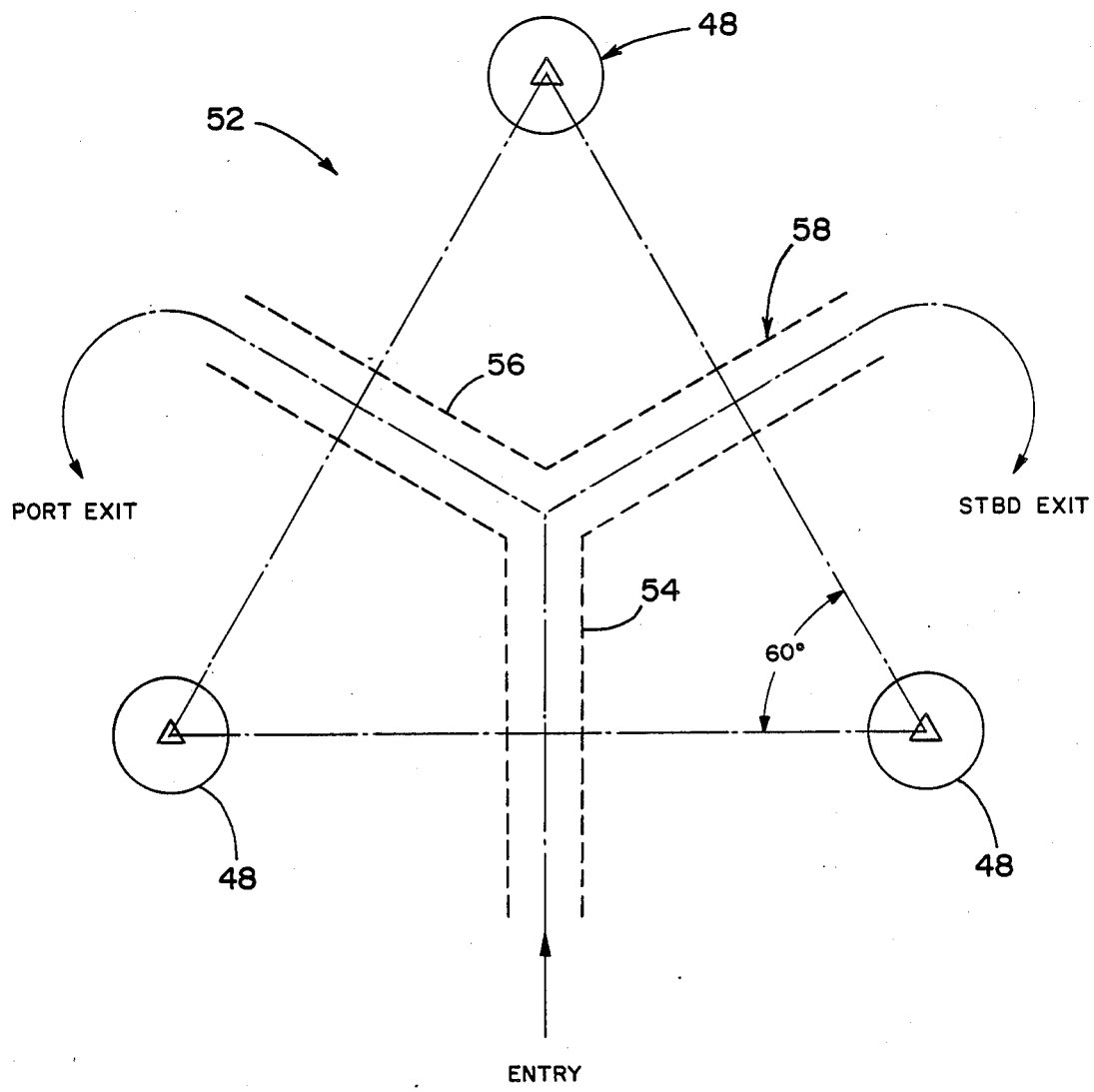

FIGS. 10d–10g illustrate modifications of the basic artificial reef systems illustrated in FIGS. 10a–10c. FIG. 10d illustrates an artificial reef system 52 for use in a lagoon. Three standard reef systems 48 of FIG. 10b are arranged in an equilateral triangular pattern, with the distance between each system being approximately 1,000 yards. A trolling lane is arranged so that each leg of the equilateral triangle is intersected at its midpoint, as shown by paths 54, 56, and 58.

Figure 10E:
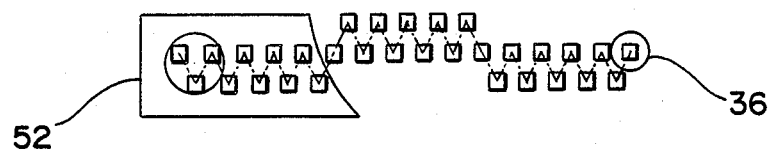
Figure 10F:
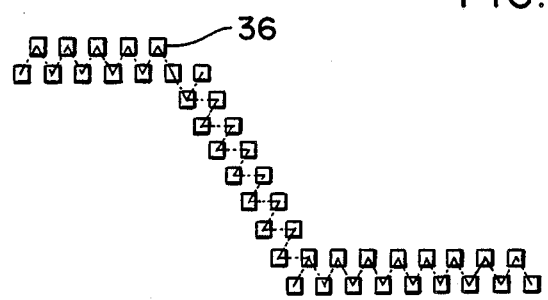

FIGS. 10e and 10f illustrate alternative barrier-type artificial reef systems including a plurality of basic barrier reef systems 52.

Figure 10G:
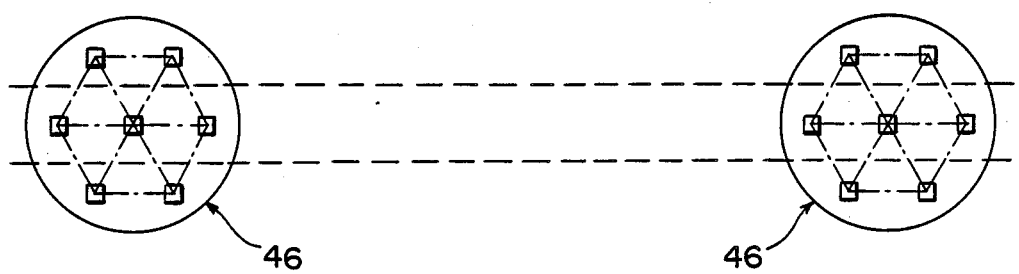

FIG. 10g illustrates a mini-artificial reef system having a trolling lane. Two mini-artificial reef systems 46 are separated by a trolling lane approximately 1,000 yards long.

It is considered within the scope of this invention that the artificial reef systems described above can be modified to fit the particular contours of any underwater terrain. Furthermore, the artificial reef modules of the present invention can be arranged in various types of artificial reef systems for providing maximum surface area for enhancing the growth and accumulation of microorganisms.

The above description is intended by way of example only and is not intended to limit the present invention in any way, except as set forth in the following claims.

We claim:

1. An artificial reef module for substantially permanent submergence underwater and for providing forage and shelter for small fish and crustaceans, said module comprising:

a feeding and shelter column formed of a plurality of semi-rigid, corrugated planar sheets, each sheet having a predetermined surface area for allowing settlement, attachment and growth of microorganisms during complete submergence of said column, said sheets being superposed and attached together along their length with the respective corrugations of adjacent corrugated sheets extending transverse to each other so that a plurality of partially enclosed spaces are created between adjacent sheets to provide a habitat and protection for small fish and crustaceans; and anchoring means attached to one end of said column for substantially permanent securing said column to the floor of a body of water in a substantial vertical orientation.

2. The artificial reef module of claim 1, wherein said corrugated sheets are formed of polyvinyl chloride.

3. The artificial reef module of claim 1, wherein said anchoring means includes a convergent tip for engaging the floor of said body of water.

4. An artificial reef system having a plurality of artificial reef modules to create a feeding and shelter environment for fish and for placement on the floor of a body of water in a set of modules, said system comprising:

a central artificial reef module; and four peripheral artificial reef modules positioned on the floor of said body of water equidistant from and spaced around said central module, said central artificial reef module and each of said four peripheral artificial reef modules including a feeding and shelter column formed of a plurality of semi-rigid, corrugated planar sheets, each sheet having a predetermined surface area for allowing settlement, attachment and growth of microorganisms during complete submergence of said column, said sheets being superposed and attached together along their length with the respective corrugations of adjacent corrugated sheets extending transverse to each other so that a plurality of partially enclosed spaces are created between adjacent sheets to provide a habitat and protection for small fish and crustaceans; and anchoring means attached to one end of said column for substantially permanent securing said column to the floor of a body of water in a substantial vertical orientation.

5. The artificial reef system of claim 4, wherein said peripheral modules are each positioned at a spacing of substantially 90° relative to said central artificial reef module.

6. The artificial reef system of claim 4, wherein said central module is formed into the shape of a cross.

7. An artificial reef system comprising a plurality of artificial reef modules forming a feeding and shelter environment for fish and for placement on the floor of a body of water to form an artificial reef, each of three sets of modules including a central module, and four peripheral modules positioned at points on the floor of said body of water equidistant from and around said central module, said sets of modules positioned on the floor of said body of water outline an equilateral triangle such that each set is placed at a corner of the equilateral triangle, each of said modules including a feeding and shelter column formed of a plurality of semi-rigid, corrugated planar sheets, each sheet having a predetermined surface area for allowing settlement, attachment and growth of microorganisms during complete submergence of said column, said sheets being superposed and attached together along their length with the respective corrugations of adjacent corrugated sheets extending transverse to each other so that a plurality of partially enclosed spaces are created between adjacent sheets to provide a habitat and protection for small fish and crustaceans; and anchoring means attached to one end of said column for substantially permanent securing said column to the floor of a body of water in a substantial vertical orientation.

8. An artificial reef system comprising a plurality of artificial reef modules forming a feeding and shelter environment for fish and for placement on the floor of a body of water, said modules arranged into a plurality of sets of modules, each set of modules including a central module and four peripheral modules positioned at points equidistant from and around said central module, said sets of modules positioned on the floor of said body of water so that a central set is surrounded by six peripheral sets positioned at points equidistant from and around said central set so that the adjacent peripheral sets are located at the six vertices of a hexagon having six sides of substantially equal length, each of said modules including a feeding and shelter column formed of a plurality of semi-rigid, corrugated planar sheets, each sheet having a predetermined surface area for allowing settlement, attachment and growth of microorganisms during complete sub-mergence of said column, said sheets being superposed and attached together along their length with the respective corrugations of adjacent corrugated sheets extending transverse to each other so that a plurality of partially enclosed spaces are created between adjacent sheets to provide a habitat and protection for small fish and crustaceans; and anchoring means attached to one end of said column for substantially permanent securing said column to the floor of a body of water in a substantial vertical orientation.

9. An artificial reef system comprising a plurality of artificial reef modules forming a feeding and shelter environment for fish and for placement on the floor of a body of water, said modules arranged into a plurality of sets of modules, each set of modules comprising a central module and four peripheral modules positioned at points equidistant from and around said central module, said sets positioned on the floor of said body of water so that an equilateral triangle is outlined, with each side of said triangle including two end sets lying on the vertices of said triangle and two inner sets located between said end sets, and arranged so that all of said sets including a side of said triangle are substantially equally spaced from each other, and a central set positioned at a point interior to said triangle and equidistant from two inner sets on a side of said triangle, each of said modules including a feeding and shelter column formed of a plurality of semi-rigid, corrugated planar sheets, each sheet having a predetermined surface area for allowing settlement, attachment and growth of microorganisms during complete submergence of said column, said sheets being superposed and attached together along their length with the respective corrugations of adjacent corrugated sheets extending transverse to each other so that a plurality of partially enclosed spaces are created between adjacent sheets to provide a habitat and protection for small fish and crustaceans; and anchoring means attached to one end of said column for substantially permanent securing said column to the floor of a body of water in a substantial vertical orientation.

10. An artificial barrier reef system comprising a plurality of artificial reef modules forming a feeding and shelter environment for fish and for placement on the floor of a body of water, said modules arranged into a plurality of sets of modules, each set of modules including a central module and four peripheral modules positioned at points equidistant from and around said central module, said sets positioned on the floor of said body of water in parallel linear arrays, said sets in each array being equally spaced from each other and said arrays positioned relative to each other so that an equilateral triangle is outlined with each set in one array occupying one vertex of the triangle and the nearest two adjacent sets in an adjacent array occupying the remaining vertices of said triangle, each of said modules including a feeding and shelter column formed of a plurality of semi-rigid, corrugated planar sheets, each sheet having a predetermined surface area for allowing settlement, attachment and growth of microorganisms during complete submergence of said column, said sheets being superposed and attached together along their length with the respective corrugations of adjacent corrugated sheets extending transverse to each other so that a plurality of partially enclosed spaces are created between adjacent sheets to provide a habitat and protection for small fish and crustaceans; and anchoring means attached to one end of said column for substantially permanent securing said column to the floor of a body of water in a substantial vertical orientation.

11. The artificial reef system of claim 1, wherein said corrugations of adjacent sheets extend substantially perpendicular to each other.

12. The artificial reef module of claim 1, wherein said sheets are positively charged for enhancing microorganism growth through polarization of organic macromolecules on said sheets.

* * * * *